Sept. 11, 1962  A. E. OSBORN  3,053,586
FLOATING GASKET MECHANISM
Filed Jan. 3, 1958
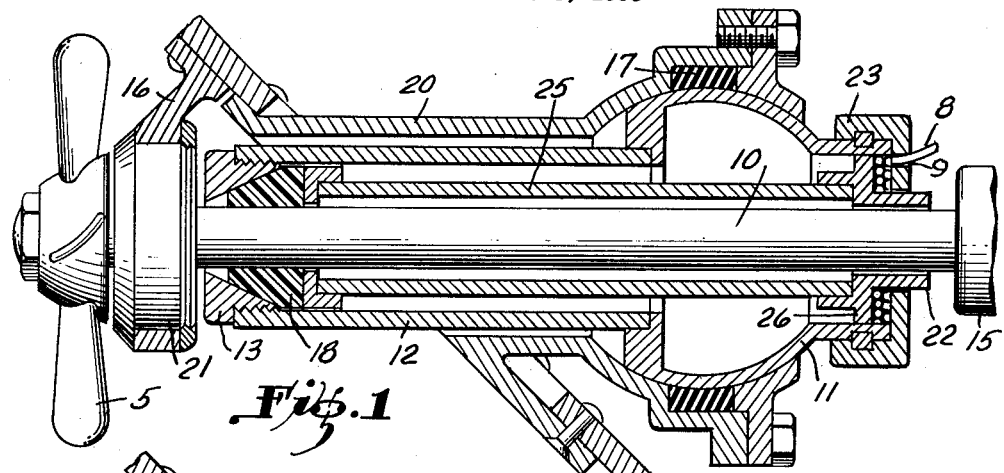
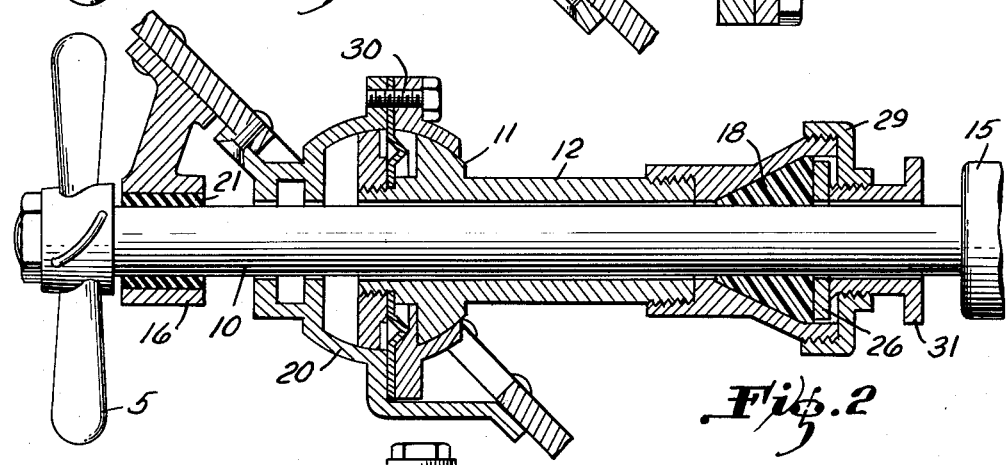
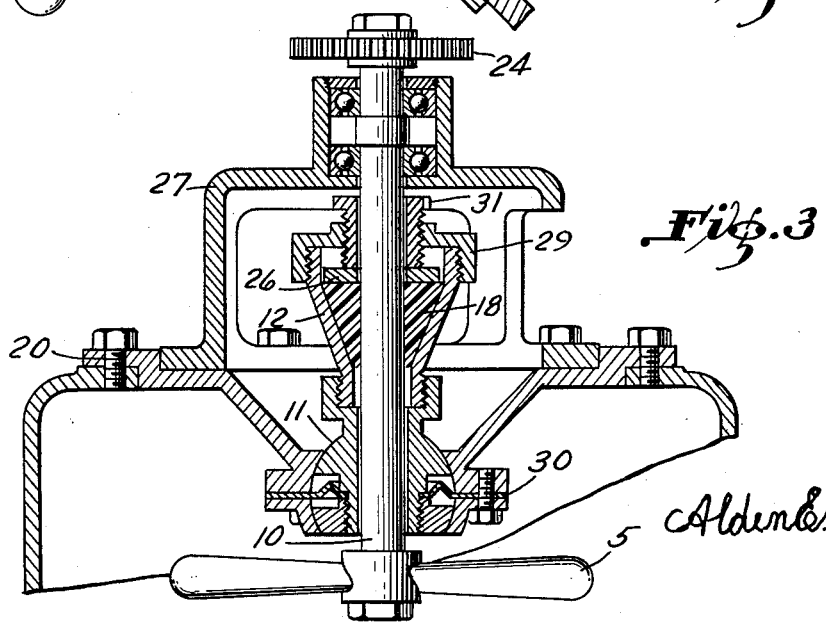
INVENTOR
Alden E. Osborn.

United States Patent Office 3,053,586
Patented Sept. 11, 1962

3,053,586
FLOATING GASKET MECHANISM
Alden E. Osborn, 25 Willard Ave., Mount Vernon, N.Y.
Filed Jan. 3, 1958, Ser. No. 706,913
8 Claims. (Cl. 308—36.1)

The object of this invention is to provide a packing or leakage-preventing device for propeller or other rotating shafts, in which the packing is subjected to a minimum side pressure and is free to follow small changes in shaft position, due to eccentricity, worn bearings or other causes, without the packing being deformed by the shaft movement.

With packing means, as usually arranged, it is necessary to have the packing in itself accommodate shaft deflections by making it of relatively soft or springy materials that maintain a tight joint when the shaft moves to one side or the other. Thus, with the usual mounting of the packing, one side is made tighter than is desirable (causing unnecessary friction and wear) and the other side is loosened and tends to leak if the packing is not sufficiently elastic to accommodate the shaft movement. In your petitioner's device the packing is not subjected to any greater side pressure or loosening when the shaft bearing surface is running to one side of its normal position than when it is centered, so that a different and less elastic material can be used and, it is believed that a relatively hard material, such as Teflon, may be used to provide that the packing would operate for a long time without requiring attention. Very small adjustments for wear would be required, and my invention does include a fine and easily-operated adjusting means that, when the device is used for propeller shafts or for the shafts of mixing tanks, would permit the adjustment from inside the vessel or from outside the mixing tank.

In the accompanying drawing, the adaptation of my invention to two different uses is shown, but it should be understood that it can have other fields of application and that it can be modified to meet special requirements within the scope of my invention as defined in the claims. It should also be understood that certain features of my invention, as illustrated in one figure, can be inserted into the device of another figure. Thus, the method of tightening and adjusting the packing shown in FIG. 1 can be applied to the construction of FIGS. 2 and 3, or vice versa, if desired.

FIG. 1 represents a longitudinal sectional view of one form of my invention as applied to a marine propeller shaft.

FIG. 2 represents a longitudinal sectional view of a modification of FIG. 1 also applied to a propeller shaft, and FIG. 3 represents a vertical sectional view of a modification of FIG. 2 applied to a mixing tank agitator shaft.

In FIG. 1 the propeller shaft 10 is shown as carried by a bearing support 16 adjacent to the propeller 5 and by another bearing support 15 inside of the vessel, which can also include the thrust bearing members. The shaft 10 is surrounded by a sleeve 12 that is provided, at its inner end, with a ball member 11 which pivots inside a socket on the supporting member 20 that extends around the sleeve 12 with a clearance between the sleeve and support. The socket of the member 20 contains a gasket 17 that surrounds the ball member 11 and prevents water in the space between the sleeve 12 and support 20 from leaking into the vessel while allowing the free movement of the sleeve inside of the support to the extent allowed by the sleeve clearance. The outer end of the sleeve 12 is provided with an internally tapered member 13 that is shown as being adjacent to the bearing 21, but need not necessarily be mounted in a sleeve extending so close to this bearing. The internally tapered member 13 encloses the packing or gasket 18 and is shown as detachable by being threaded into the sleeve 12 so that it can be removed when it is desired to expose the gasket 18.

In the construction shown in FIG. 1, where the internally tapered member 13 and gasket 18 are close to the bearing support 16, the opening through the support for the bearing bushing 21 is made larger than the O.D. of the member 13, so that, by moving this bushing, the tapered member and gasket or packing 18 can be passed through the bearing support and, if the propeller 5 is removed, taken off the shaft. The adjustment of the gasket 18 is accomplished through the movement of the inner sleeve 25 and utilizes the principle disclosed in my Pipe Joint Patent No. 2,420,838, in which a flexible element (cord or wire) is drawn into a space through a hole in the winding collar by the rotation of the collar, and, by filling this space with more or less wound-in material, causes a longitudinal movement of a part against which the wound material is compressed. In the present instance the rotatable winding collar is numbered 23 and has a side hole 9, and the winding in of the flexible element 8 displaces the washer 26 and sleeve 25 longitudinally and forces the gasket 18 into the tapered member 13 and thereby tightens it against the shaft 10. The adjustment is positive and can be very small and close, and a heavy longitudinal pressure can be obtained. The extension 22 of the washer is provided in order to prevent the wound-in material from contacting with the revolving shaft 10, and is a new feature (that is claimed herein) not provided for in my aforesaid patent. It will be noted that the movement of the ball 11 surfaces at the gasket 17 is very small in relation to the movement due to the shaft eccentricity or bearing looseness, and that this small movement can be accommodated by the flexing of the gasket material so that no slip would occur between the gasket 17 and ball 11, and thus this gasket would have a long life. However, a modification of this ball and gasket construction is shown in FIGS. 2 and 3, in which a flexible plate or corrugated diaphragm 30 is substituted for the gasket 17 of FIG. 1. This diaphragm, like the gasket, is subjected to a very small movement, and, it is believed, would last indefinitely.

In FIG. 2 a modification is shown in which the ball joint is arranged adjacent to the propeller bearing 21, while the tapered packing is inside of the vessel and adjacent to the shaft bearing support 15, with the gasket adjustment acting directly on the gasket. This adjustment means is, in this FIG. 2, composed of a threaded collar 31 that engages a thread in the cover 29 attached to the extended end of the ball member so that the rotation of the collar 31 would adjust the longitudinal position of the tapered gasket. This method of adjustment does not enable as high adjustment pressures to be obtained or permit the very small movements of the gasket that are possible with the wound cord or wire of FIG. 1, but might be preferred in some cases.

In FIG. 3 a further modification of my invention is illustrated, together with another method of its utilization. It is, in this figure, applied to the agitator shaft 10 of a mixing tank for chemicals or other liquids. This shaft 10, on which is mounted a driving gear, pulley, or other rotating means 24, is carried on bearings 28 in a supporting member 27 and extends through the packing 18 into the tank with the agitator 5 on its lower end. The packing 18 fits into the internally tapered end on the member 12, which is pivoted on a ball joint 11 operating in the socket of the tank cover 20 which is shown as bolted to the top of the tank, although, in smaller sizes, it might be threadably attached thereto. The ball joint is prevented from leaking by a flexible diaphragm 30 that permits small movements of the ball should the shaft move to one side or run out of true. A packing or gasket, as in FIG. 1, can be used if desired. It will be noted that the gasket 18 can follow the shaft with practically no side pressure and it is believed that it would be subjected to little friction or wear and, if made of Teflon, would have a very long life. The adjustment of the packing is shown as of the threaded type of FIG. 2, but the wound-in form of FIG. 1 could obviously be employed.

It should be understood that while the packing illustrated in the accompanying drawing is shown as made of a single piece of material, it can be in sections or segments or in spirally-wound form having the same tapered outside shape as is illustrated. While my invention makes it possible to employ unusal material for the packing, it is believed that, even when ordinary materials are used, the life of the packing would be extended. When soft or flexible materials are used, the containing member obviously need not have a tapered internal surface as it can be adjusted by the usual compression methods.

I claim:

1. In a means for preventing fluid leakage along revolving shafts, the combination, with a revolving shaft, of a sleeve loosely surrounding said shaft, a fluid-tight flexible supporting means at one end of said sleeve both permitting the oscillation of said sleeve and preventing the leakage of fluid therethrough, a packing means at the other end of said sleeve between said sleeve and said shaft, and being spaced from said supporting means by said sleeve whereby the oscillating movement of said shaft and said packing produces a reduced oscillating movement at said supporting means, and an adjusting means, adjacent to said supporting means and separated from contact with said fluid, for regulating the pressure of said packing against said shaft.

2. In a means for preventing fluid leakage along revolving shafts the combination, with a revolving shaft of a sleeve spaced from and loosely surrounding said shaft, a support for one end of said sleeve and spaced from and surrounding said sleeve, a fluid-tight oscillatable joint between said sleeve support and said sleeve to permit the oscillation of said sleeve while preventing fluid leakage through said joint from said space between said support and said sleeve, a packing means at the other end of said sleeve for preventing fluid leakage between said sleeve and said shaft, and an adjusting means adjacent said oscillatable joint for regulating the pressure of said packing against said shaft including means extending between said sleeve and said shaft to transmit the movement of said adjusting means to said packing means.

3. In a means for preventing fluid leakage along revolving shafts the combination, with a revolving shaft of, a sleeve spaced from and loosely surrounding said shaft, a fluid-tight support for said sleeve, a fluid-tight oscillatable joint between said support and one end of said sleeve to permit the oscillation of said sleeve while preventing fluid leakage through said joint, a packing means at the other end of said sleeve for preventing fluid leakage between said sleeve and said shaft, and an adjusting means, separated from contact with said fluid, for regulating the pressure of said packing against said shaft and operable without subjecting said oscillatable joint to pressure.

4. In a means for preventing fluid leakage along revolving shafts, the combination, with a revolving shaft, of a sleeve spaced from and loosely surrounding said shaft, an oscillatable supporting joint for one end of said sleeve, comprising a ball joint and including a fluid-tight barrier whereby to permit the oscillation of said sleeve while preventing fluid leakage through said joint, a packing means at the other end of said sleeve for preventing fluid leakage between said sleeve and said shaft, and an adjusting means, separated from contact with said fluid, for regulating the pressure of said packing against said shaft without applying longitudinal pressure to said oscillatable joint.

5. In a means for preventing fluid leakage along revolving shafts, the combination, with a revolving shaft, of a sleeve spaced from and loosely surrounding said shaft, a fluid-tight oscillatable supporting joint for one end of said sleeve permitting the oscillation of said sleeve while preventing fluid leakage through said joint, a socket on the other end of said sleeve having a tapered interior surface, a packing in said socket having an exterior tapered surface engaging said socket tapered surface, and means for longitudinally moving said packing into said sleeve socket taper to regulate the pressure of said packing against said shaft including an adjusting means, separated from contact with said fluid for regulating the longitudinal movement of said packing without applying pressure to said oscillatable supporting joint.

6. In a means for preventing fluid leakage along revolving shafts, the combination, with a revolving shaft, of a sleeve loosely surrounding said shaft, a fluid-tight flexible support for one end of said sleeve permitting the oscillation thereof while preventing fluid leakage from a space surrounding said shaft, a socket at the other end of said sleeve having a tapered interior surface, a packing in said socket having a tapered exterior surface engaging said tapered socket surface, a longitudinally movable member engaging an end of said packing, and means for moving said member longitudinally comprising a collar having an internal radial flange and rotatably mounted on the end of said sleeve member, a hole through said flange of said collar and opening into a space between said longitudinally movable member and the inner surface of said flange collar, and a flexible element wound into said space, through said hole by the rotation of said collar, to longitudinally displace said movable member.

7. In a longitudinally adjusted rotatable shaft packing means, a shaft packing, a member enclosing said packing, a collar rotatably mounted on said member and having an inwardly projecting flange with a central opening therein, a hole thru the wall of said flange, a washer member acting longitudinally against said packing and having a sleeve extension, surrounding said rotatable shaft and passing through said central opening of said flange of said collar, and a flexible element wound, through said hole and by the rotation of said collar, between said washer and the inside surface of said flange and around the sleeve extension of said washer with said extension separating said flexible element from contact with said shaft.

8. In a means for preventing fluid leakage along a revolving shaft, comprising the combination, with said revolving shaft, of a packing means surrounding said shaft, a detachable retaining member at one of said packing means to position said packing longitudinally, a bearing for said shaft, on the opposite side of said retaining member from said packing, having an enlarged diameter outer surface, and a supporting member having a socket portion containing a socket opening encircling said bearing of a larger internal diameter than the external diameter of said retaining member and packing whereby, when said bearing is withdrawn from said socket opening and said retaining member released, said retaining member and said packing can be passed longitudinally along said shaft and through said socket opening.

References Cited in the file of this patent

UNITED STATES PATENTS

| | | |
|---|---|---|
| 246,185 | Monroe | Aug. 23, 1881 |
| 1,063,389 | Robbins | June 3, 1913 |
| 1,288,707 | Sharp | Dec. 24, 1918 |
| 1,715,483 | Walker | June 4, 1929 |
| 1,902,360 | Foster | Mar. 21, 1933 |
| 2,388,129 | Eisenbeis | Oct. 30, 1945 |
| 2,420,838 | Osborn | May 20, 1947 |